United States Patent [19]
Schneider et al.

[11] Patent Number: 5,623,542
[45] Date of Patent: *Apr. 22, 1997

[54] COMBINATION TELEPHONE NETWORK INTERFACE AND CABLE TELEVISION APPARATUS AND CABLE TELEVISION MODULE

[75] Inventors: Pina R. Schneider, Matawan; Avraham Tuvy, Oakhurst, both of N.J.

[73] Assignee: Antec Corp., Rolling Meadows, Ill.

[ * ] Notice: The term of this patent shall not extend beyond the expiration date of Pat. No. 5,394,466.

[21] Appl. No.: 658,425

[22] Filed: Jun. 14, 1996

Related U.S. Application Data

[63] Continuation of Ser. No. 272,604, Jul. 11, 1994, abandoned, which is a continuation-in-part of Ser. No. 18,327, Feb. 16, 1993, Pat. No. 5,394,466.

[51] Int. Cl.⁶ .................................................. H04M 11/00
[52] U.S. Cl. ................................ 379/399; 379/412; 348/8
[58] Field of Search .................................. 379/326, 397, 379/399, 412, 90, 53; 348/6, 7, 8, 10; 439/578, 579, 580, 581, 582, 583, 498, 92; 361/601, 602, 641, 823, 826, 827, 828

[56] References Cited

U.S. PATENT DOCUMENTS

| | | | |
|---|---|---|---|
| 3,610,810 | 10/1971 | Fribley, Jr. | 361/641 X |
| 3,760,130 | 9/1973 | Ross et al. | 361/641 X |
| 3,989,333 | 11/1976 | Cauldwell | 361/641 X |
| 4,133,021 | 1/1979 | King et al. | 361/660 |
| 4,266,266 | 5/1981 | Sanner | 361/643 |
| 4,578,702 | 3/1986 | Campbell, III | 348/6 X |
| 4,764,849 | 8/1988 | Khan | 361/827 |
| 4,785,376 | 11/1988 | Dively | 361/641 X |
| 4,794,490 | 12/1988 | Epstein | 361/827 |
| 4,873,600 | 10/1989 | Vogele | 361/823 |
| 4,887,187 | 12/1989 | Nickola | 361/826 X |
| 4,912,615 | 3/1990 | Blobana | 361/827 |
| 4,945,559 | 7/1990 | Collins et al. | 379/399 |
| 4,949,376 | 8/1990 | Nieves et al. | 379/399 |
| 4,979,209 | 12/1990 | Collins et al. | 379/399 |
| 5,117,122 | 5/1992 | Hogarth et al. | 307/140 |
| 5,130,893 | 7/1992 | Straate et al. | 361/728 |
| 5,160,271 | 11/1992 | Franks, Jr. | 439/92 |
| 5,184,279 | 2/1993 | Horn | 361/641 |
| 5,196,988 | 3/1993 | Horn | 361/651 |
| 5,247,347 | 9/1993 | Litteral et al. | 348/14 X |
| 5,327,114 | 7/1994 | Straate et al. | 340/286.06 |
| 5,359,654 | 10/1994 | Jensen et al. | 379/399 X |
| 5,363,432 | 11/1994 | Martin et al. | 379/90 |
| 5,408,260 | 4/1995 | Arnon | 348/6 |
| 5,440,335 | 8/1995 | Beveridge | 348/13 |
| 5,469,495 | 11/1995 | Beveridge | 348/14 X |

OTHER PUBLICATIONS

Keptel Brochure, RVCT, CATV/Telephone Weatherproof Interface Unit, Two pages duplexed, ® 1989 Keptel, Inc.
Keptel Brochure, Cable Guard, OPE 9200, two pages duplexed, ® 1994 Keptel, Inc.

*Primary Examiner*—Krista M. Zele
*Assistant Examiner*—Scott L. Weaver
*Attorney, Agent, or Firm*—R. Gale Rhodes, Jr.

[57] ABSTRACT

Combination telephone network interface apparatus for interconnecting an incoming telephone lines to a telephone subscriber premises line and cable television module mounted to the telephone network interface apparatus and for connecting incoming cable television signals to a television set or sets of the telephone company subscriber(s). Cable television module embodiments, per se, for being mounted to telephone network interface apparatus and for connecting incoming cable television signals to the aforementioned television sets.

18 Claims, 10 Drawing Sheets

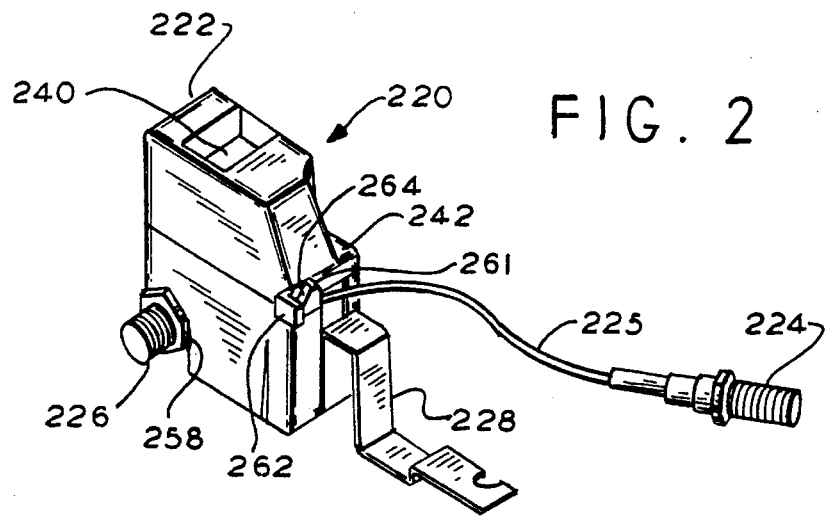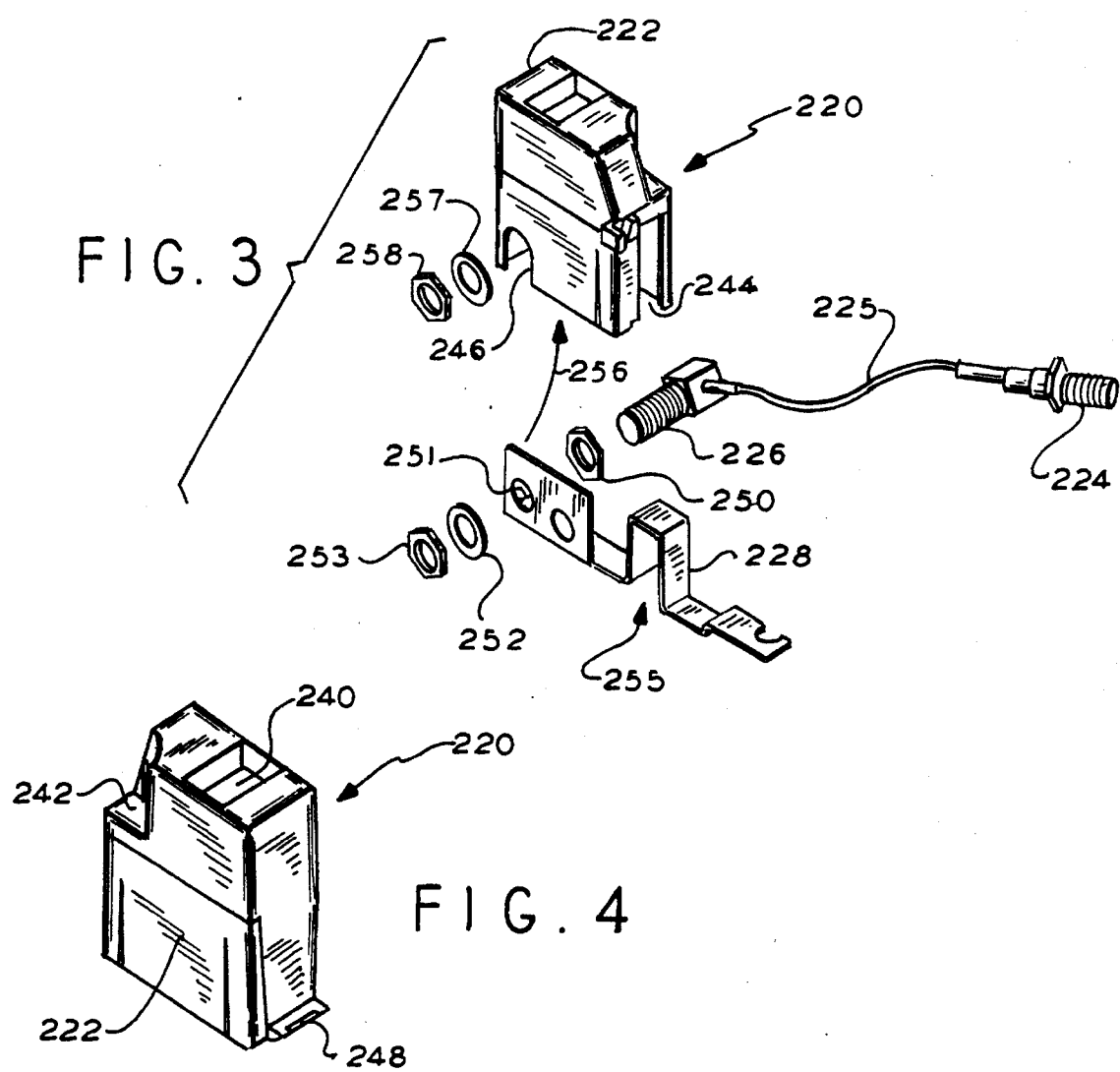

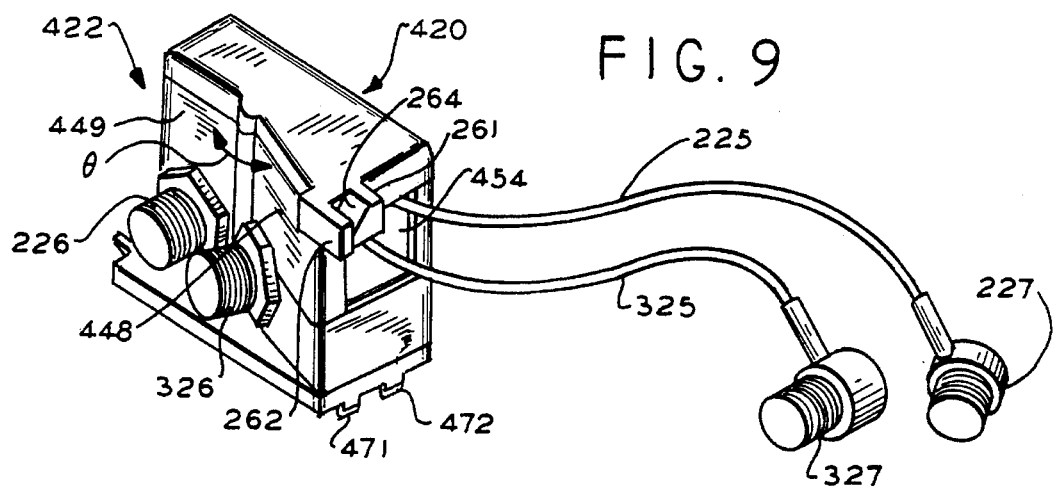
FIG. 9
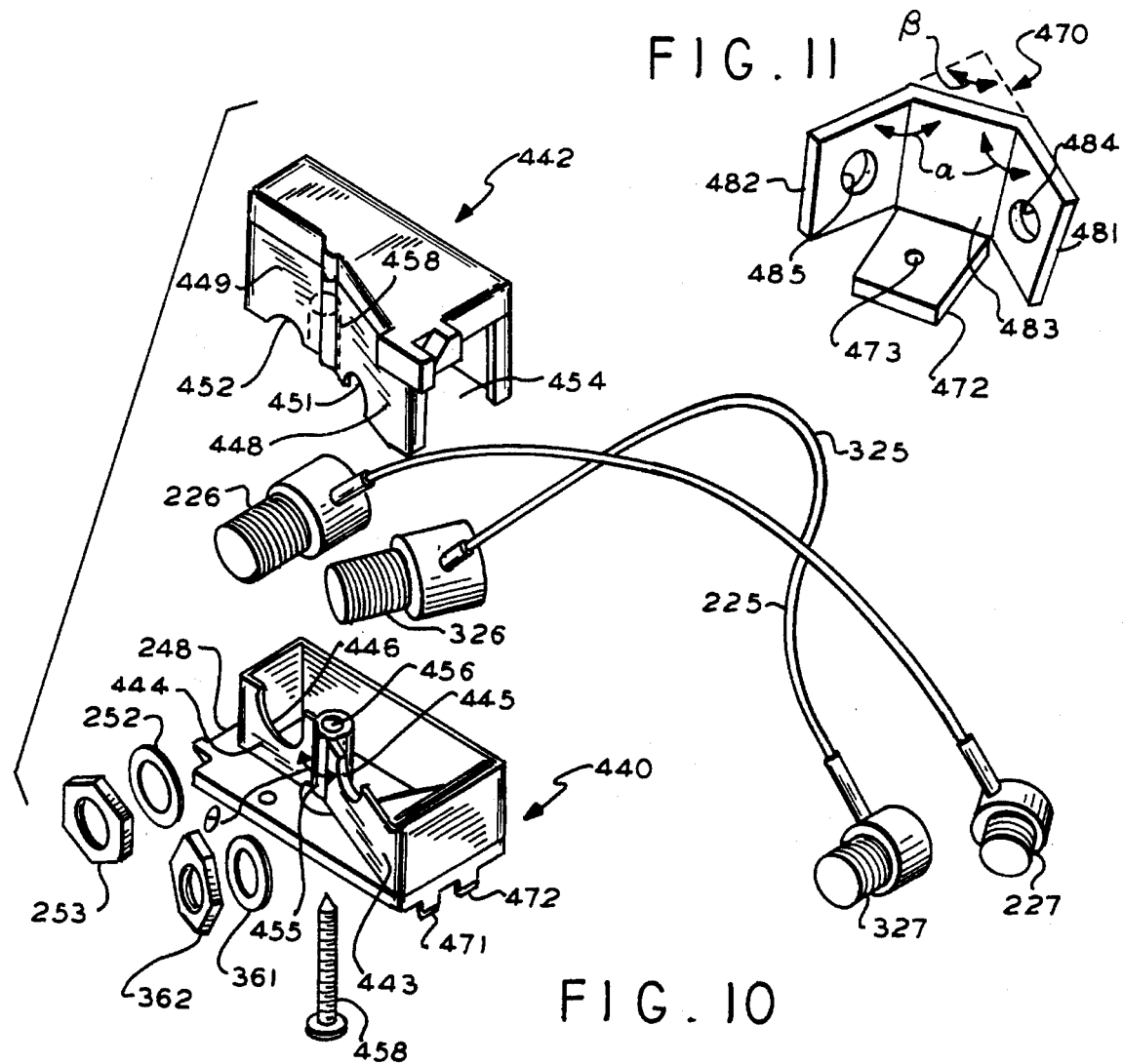
FIG. 11
FIG. 10

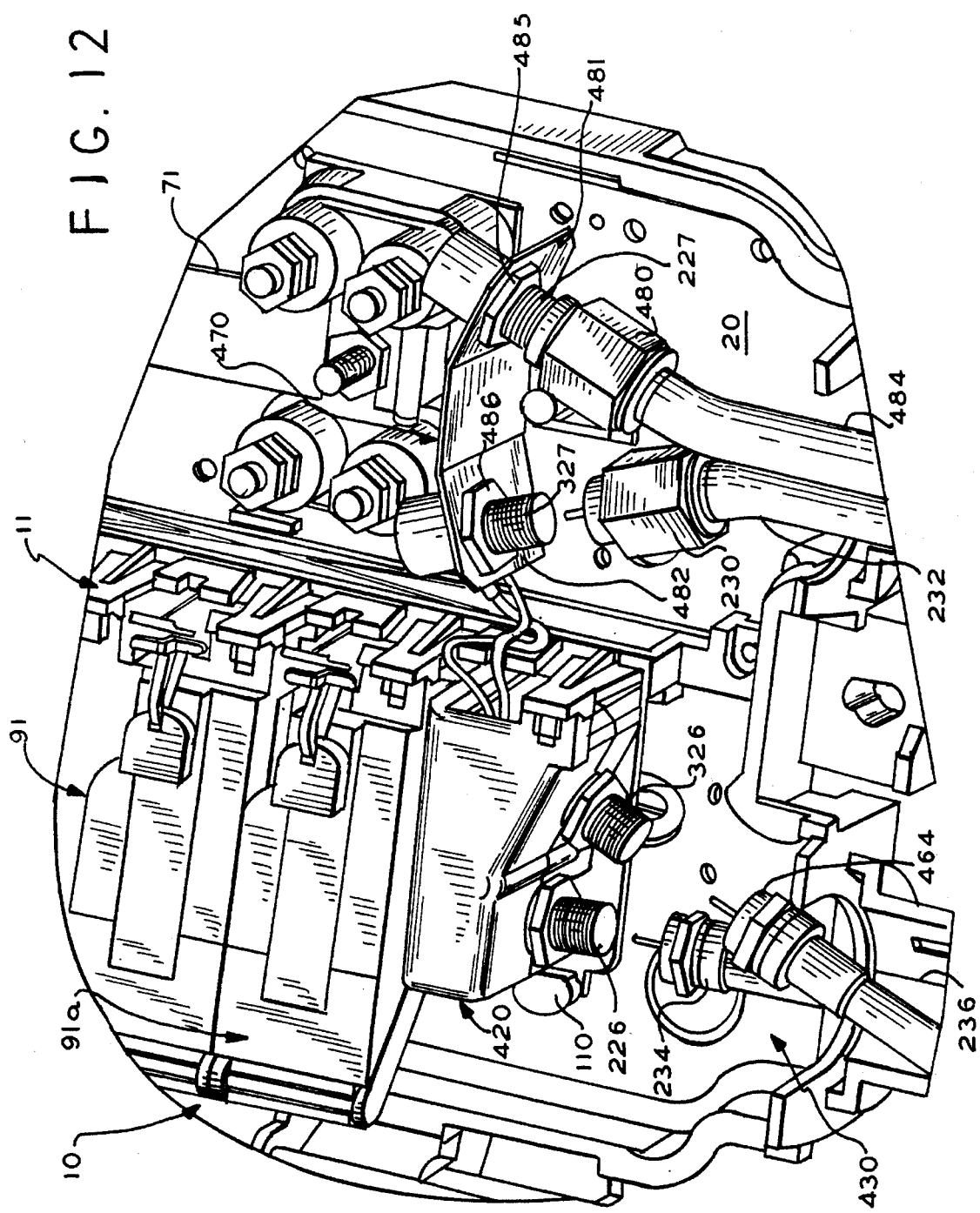

COMBINATION TELEPHONE NETWORK INTERFACE AND CABLE TELEVISION APPARATUS AND CABLE TELEVISION MODULE

This application is a continuation of application Ser. No. 08/272,604, filed Jul. 11, 1994, now abandoned as of the filing date of this continuation application, which application is a continuation-in-part of Ser. No. 08/018,327, filed Feb. 16, 1993, now U.S. Pat. No. 5,394,466.

BACKGROUND OF THE INVENTION

This invention relates to combination apparatus for connecting incoming telephone company wiring or lines to telephone subscriber premises wiring or lines and for connecting incoming cable television signals to one or more television sets such as for example the television set or sets of a telephone company subscriber or customer.

This invention further relates to a cable television module particularly useful for being mounted, for example removably mounted, to telephone network interface apparatus through which one or more incoming telephone lines can be connected to one or more telephone subscriber's or telephone customer's telephones. The module is for connecting incoming cable television signals to one or more television sets, for example a television set or sets belonging to one of the telephone company subscribers or customers.

Numerous telephone network interface apparatus are known to the art for being mounted at a multiple dwelling such as an apartment house or condominium and which telephone network interface apparatus are for connecting one or more incoming telephone lines, typically a plurality of incoming telephone lines, to one or more telephone subscriber's or customer's telephones located at various apartments or condominiums comprising the multiple dwelling. Also known to the art are telephone network interface apparatus including one or more individual subscriber line modules, typically a plurality of such modules, with each individual subscriber line module for connecting one incoming telephone company line to one of the telephone customer's telephones. Such individual subscriber line modules, as known to the art, provide a demarcation point, telephone demarcation point, between a telephone subscriber's or customer's line and an incoming telephone line to facilitate the determination of whether a fault exists on the telephone customer or subscriber's line or the incoming telephone company line. Such telephone network interface apparatus and the individual subscriber line modules, as is also known to the art, are typically located in a common area, such as the basement of the apartment house or condominium, whereby a telephone repairman can make a ready determination of whether or not such fault exists on the telephone subscriber's line or the incoming telephone line regardless of whether the telephone subscriber or customer is home or not; such individual subscriber line module also permits the telephone customer or subscriber to make the determination of whether a fault exists on the telephone customer or subscriber's line or the incoming telephone company line. Examples of such telephone network interface apparatus and individual subscriber line modules are disclosed in U.S. Pat. No. 4,945,559, patented Jul. 31, 1990, entitled TELEPHONE NETWORK INTERFACE APPARATUS, and U.S. Pat. No. 4,979,209, patented Dec. 18, 1990 entitled INDIVIDUAL SUBSCRIBER LINE MODULE; Thomas J. Collins et al. are inventors of both patents and both patents are assigned to the same assignee as the present invention. These patents are incorporated herein by reference as if fully reproduced herein and U.S. Pat. No. 4,979,209 is referred to hereinafter as the "'209 patent."

Cable television signals are typically transmitted to a multiple dwelling over an optical fiber line which terminates at an optical network unit typically located curbside to the above-noted multiple dwelling. Typically a plurality of coaxial cables run from the optical network unit to the above-noted individual apartments or condominiums to connect the incoming cable television signals directly, or through a cable television channel selector, to the individual television sets of the cable television customers residing in the apartments or condominiums. Should one of such television sets fail to provide a television picture and audio signals or sound, a question arises in the mind of the television customer as to whether the television set is not working or whether cable television signals are not being received. The television customer typically calls the cable television company and reports the failure and then arrangements must be made to coordinate the time at which a cable television repairman can come to the television customer's apartment or condominium with the time at which the television customer is home. This is particularly difficult due to the fact that cable television repairmen typically work 8:00 or 9:00 a.m. to 5:00 p.m., and television customers, including husbands and wives, typically also work 8:00 or 9:00 a.m. to 5:00 p.m.

Accordingly, there exists a need in the art for apparatus for interconnecting a television customer's television set to incoming cable television signals which provides a cable television demarcation point between such television set and the source of such cable television signals to permit a cable television repairman to make a reasonable determination as to whether or not the failure of the television set to provide a television picture and sound is due to the television set not working or the failure to receive incoming cable television signals, and to permit such cable television repairman to make such determination while the television customer is not present at the apartment or condominium.

There also exists a need in the art for such cable television apparatus providing such cable television demarcation point and which permits the television customer to make a reasonable determination as to whether or not the failure of the television set to provide a television picture and sound is due to the television set not working or the failure to receive incoming cable television signals. If the determination indicates that the failure is due to the customer's television set not working, the customer has the television set repaired or replaced and avoids a service call from the cable television repairman and its needless attendant cost.

There further exists a need in the art for combination apparatus for connecting one or more incoming telephone company lines to one or more telephone subscribers' or customers' lines and for connecting incoming cable television signals to one or more television sets which may be, for example, the television set or sets of a telephone customer or subscriber.

Still there exists a further need in the art for cable television apparatus and cable television module which is provided with a configuration which facilitates the interconnection of coaxial cables from the customer(s) television set(s) to the module and/or which facilitates connection of coaxial cables carrying incoming cable television signals to the module or to a ground bracket, and which includes a cable television signal splitter for splitting incoming cable television signals into two or more outgoing cable television signals for connection or transmission to two or more television sets.

SUMMARY OF THE INVENTION

It is the object of the present invention to satisfy the foregoing needs in the art.

Apparatus satisfying the foregoing needs and embodying the present invention includes combination telephone network interface apparatus for connecting at least one incoming telephone company line to at least one subscriber premises line and a cable television module mounted to the telephone network interface apparatus for connecting incoming cable television signals to one or more cable television sets such as the television set or sets of the telephone company subscriber. Apparatus further satisfying the foregoing needs and embodying the present invention may include a cable television module for being mounted to the aforementioned telephone network interface apparatus and which module includes coaxial cable connectors disposed angularly with respect to each other to facilitate connection to an incoming coaxial cable carrying incoming cable television signals and a coaxial cable carrying the cable television signals to at least one television set.

DESCRIPTION OF THE DRAWINGS

FIG. 2 is a perspective view of a first embodiment of a cable television module embodying the present invention and which module is shown in the assembled condition;

FIG. 3 is a perspective exploded view of the cable television module of FIG. 1 shown in the disassembled condition;

FIG. 4 is a reverse side view, in perspective, of the module housing shown in FIG. 3;

FIG. 9 is a perspective view of an alternate embodiment of a cable television module of the present invention shown in the assembled condition;

FIG. 10 is a perspective view of the alternate cable television module of FIG. 9 shown in the disassembled condition;

FIG. 11 is a perspective view of a ground bracket of the present invention;

FIG. 12 is an enlarged view in perspective of a portion of FIG. 8 showing a pair of individual subscriber line modules mounted to the telephone network interface apparatus laterally of and in close proximity to the alternate cable television module embodiment;

DESCRIPTION OF THE PREFERRED EMBODIMENTS

Figure 1:
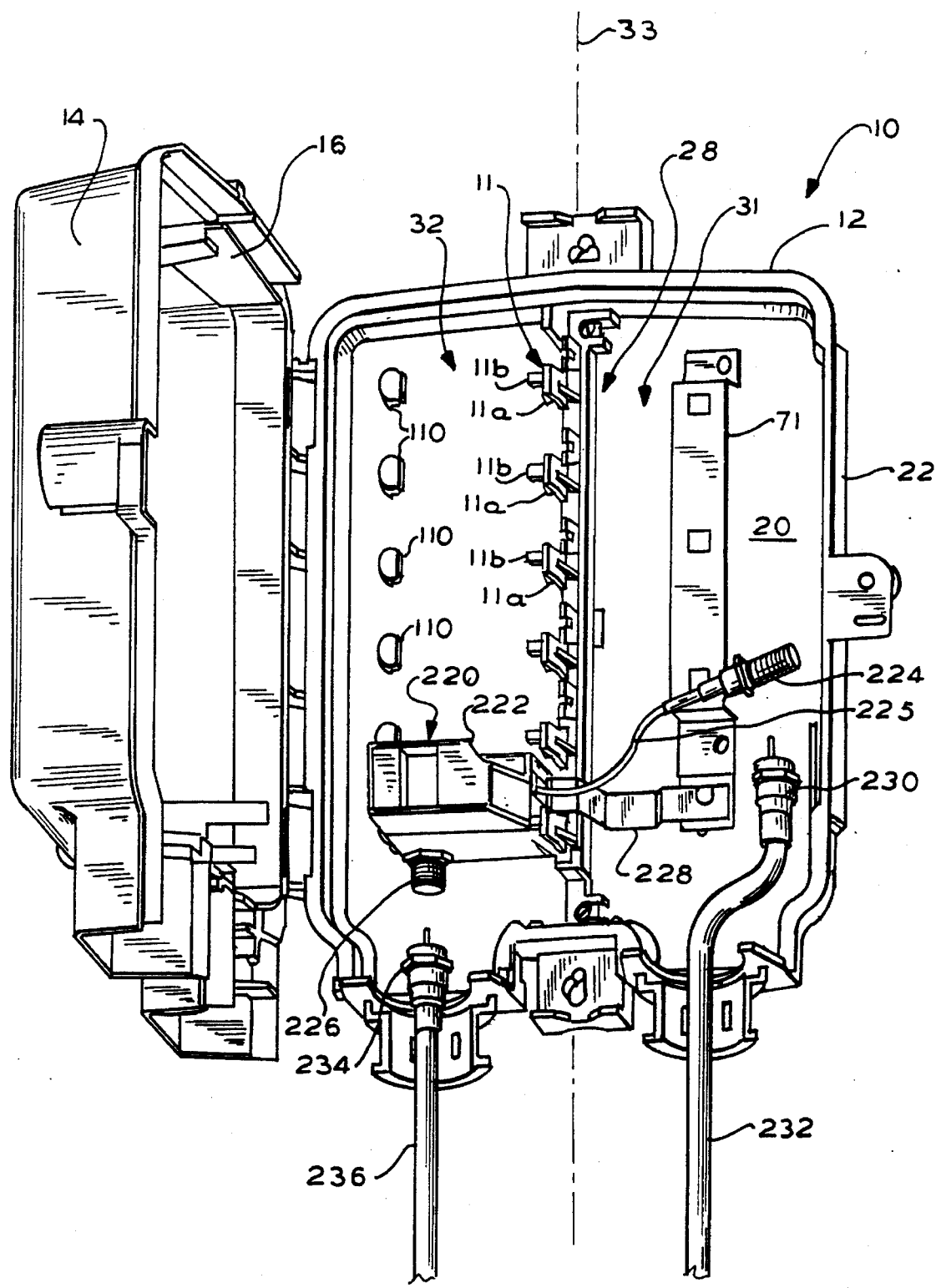
FIG. 1 is a front perspective view showing an embodiment of combination telephone network interface apparatus and a cable television module mounted to the telephone network interface apparatus, the telephone network interface apparatus is substantially the same as that disclosed in the '209 patent.

Referring to FIG. 1, it will be understood that the telephone network interface apparatus indicated by general numerical designation 10 is substantially the same as the telephone network interface apparatus disclosed in the '209 patent and also indicated by general numerical designation 10. Telephone network interface apparatus of FIG. 1 differs from that of the '209 patent in that it includes an upwardly extending module mounting or retaining member indicated by general numerical designation 11. For convenience of reference, the structural elements of the telephone network apparatus 10 of FIG. 1 corresponding to the same structural elements of the telephone network interface apparatus disclosed in the '209 patent have been given the same numerical designations as in the '209 patent and, although the '209 patent has been incorporated herein by reference, for convenience of reference a brief description of the primary structural elements of the telephone network interface apparatus 10 will be presented as well as a brief explanation of the functions of such primary structural elements.

Figure 5:
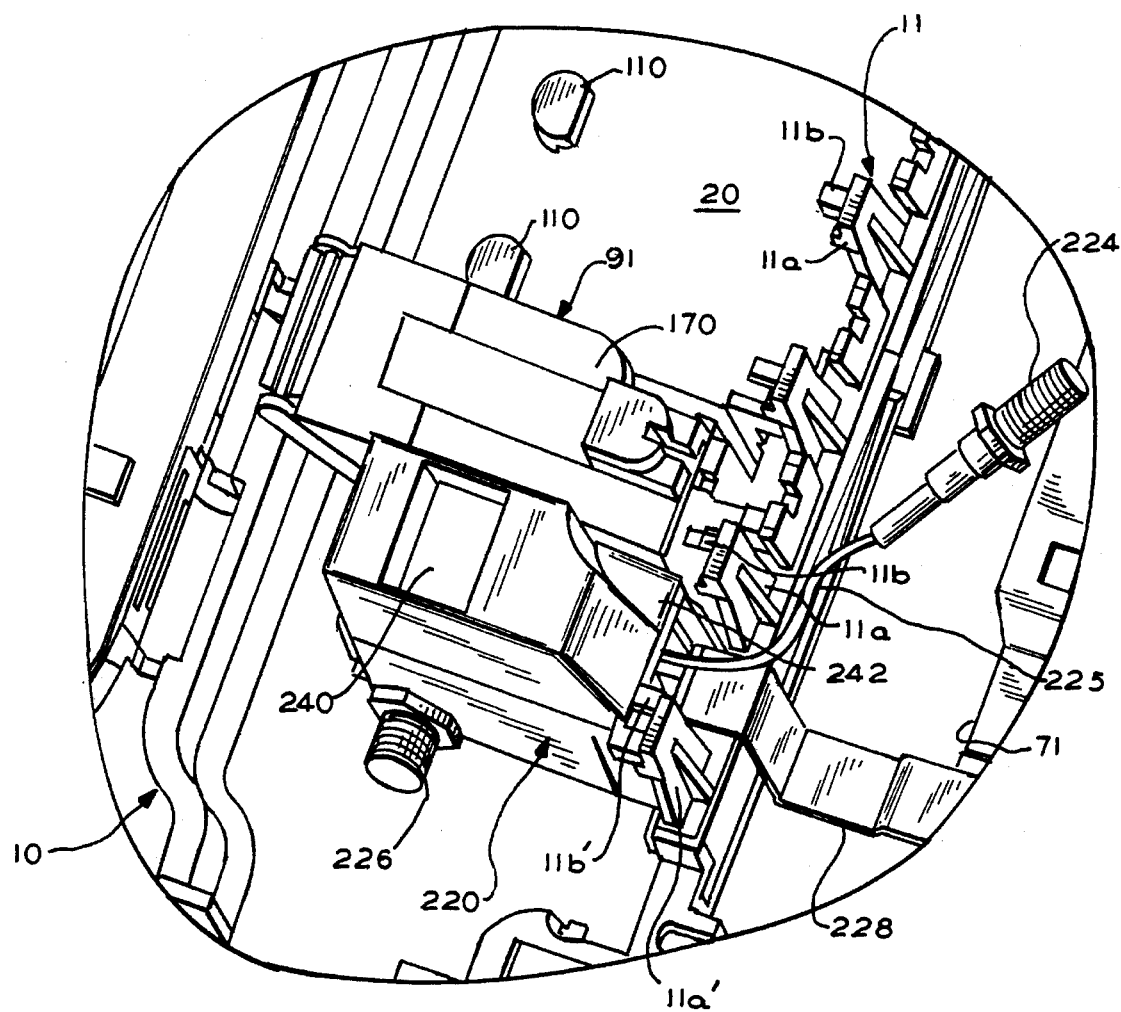
FIG. 5 is a combination embodiment of the present invention comprising telephone network interface apparatus including an enlarged view in perspective of a portion of FIG. 1 and shows an individual subscriber line module mounted to the telephone network interface apparatus laterally of and in close proximity to a cable television module, the individual subscriber line module is for connecting an incoming telephone line to a subscriber premises line.

The telephone network interface apparatus 10 of FIG. 1 comprises a housing including a base 12, a telephone company cover 14, and a subscriber cover 16. Base 12 includes a bottom 20 circumscribed by an upwardly extending wall 22 and the telephone company and subscriber covers 14 and 16 are mounted pivotally to the wall 22 as shown. The bottom 20 and wall 22 provide a compartment indicated by general numerical designation 28 and which compartment 28 is divided by the diagrammatical dividing line 33 into a telephone company compartment portion 31 and a telephone subscriber compartment portion 32. As taught in the '209 patent, the telephone company cover 14 is for being fastened only to the base 12 such as for example by a hex-headed screw, not shown, which is not easily removable by a subscriber and which requires a special type of tool not typically possessed by the subscriber but which tool is typically possessed by telephone company personnel to permit such telephone company personnel to unfasten the telephone company cover 14 from the base 12. The subscriber cover 16 is for being fastened only to the telephone company cover 14 such as for example by a screw not shown in FIG. 1. Such fastening denies the telephone customer or subscriber access to the telephone company compartment portion 31 but permits the telephone subscriber to unfasten the subscriber cover 16 from the telephone company cover 14 to gain access to the telephone subscriber compartment portion 32 which permits the telephone customer to have access to the demarcation point provided by the telephone customer's individual subscriber line module as taught in the '209 patent. Such fastening of the covers 14 and 16 also permits telephone company personnel to unfasten the telephone company cover 14 from the base 12 to thereby gain access to both the telephone company compartment 31 and the subscriber compartment 32 as is also taught in the '209 patent. A ground buss 71 is suitably mounted in the telephone company compartment 31, such as by screws not shown, and the ground buss is connected to earth ground by suitable means not shown as taught in the '209 patent. The module mounting or retaining member 11 is mounted suitably to the bottom 20 of the base 12 such as by screws not shown, and extends upwardly therefrom generally along the dividing line 33. The module mounting or retaining member 11 includes a plurality of upwardly extending flexible members 11a each provided with an outwardly extending tab 11b for being received within a notch provided on the cable television modules embodying the present invention or which tab 11b is also for extending over and wedgedly engaging a portion of the individual subscriber line module 91 as shown in FIG. 5 and described in further detail below. The module mounting or retaining member 11 may be suitably mounted to the bottom 20 of the base 12 such as by screws not shown and may be made of a suitable plastic to provide the upwardly extending members 11b with suitable flexibility and resiliency; the member 11 may be made suitably such as for example by injection molding. A plurality of upwardly extending inverted L-shaped members 110 are provided on the bottom 20. As described in detail below the members 110 cooperate with the tabs 11b in mounting the cable television module 220 removably to the telephone network interface apparatus 10; members 110 are the members 110 shown in cross-sectional side view in FIG. 10 of the '209 patent.

A cable television module embodying the present invention and indicated by numerical designation 220 is shown mounted to the telephone network interface apparatus 10 in FIG. 1. Generally, the cable television module 220 includes a housing 222, a first female coaxial cable connector 224 interconnected by a length of coaxial cable 225 to a second female coaxial cable connector 226 and a ground bracket 228; the connectors 224 and 226 are externally threaded and such connectors and the ground bracket 228 are mounted to the housing 222 in a manner described in detail below and indicated diagrammatically in FIG. 3. Further generally, it will be understood that the female coaxial cable connector 224 is for being connected to the male coaxial cable connector 230 provided on the end of the coaxial cable 232 extending partially into the telephone network interface apparatus 10 and which coaxial cable 232 is for carrying incoming cable television signals from a suitable source. The female coaxial cable connector 226 is for being connected to the male coaxial cable connector 234 provided on the end of the coaxial cable 236 extending partially into the telephone network interface apparatus 10 and which coaxial cable 236 is for being connected to a television set not shown. Upon such connections being made, the television set is connected to the incoming cable television signals.

Referring now to FIGS. 2–4, and first in particular to FIGS. 2 and 4, the housing 222 is provided with a first indentation 240 extending inwardly of the top portion of the housing and a second indentation 242 extending inwardly into a top corner portion of the housing. As described in detail below, the indentation 240 facilitates removal or dismounting of the cable television module 220 from the telephone network interface apparatus 10 (FIG. 1) and the indentation 242 facilitates removal or dismounting of an individual subscriber line module, such as individual subscriber line module indicated by general numerical designation 91 in FIG. 5, from the telephone network interface apparatus 10 upon such individual subscriber line module 91 being mounted laterally of and in close proximity to the cable television module 220. The housing 222, FIG. 2, may be provided with members 261 and 262 providing a notch 264 therebetween for facilitating mounting of the module 220 to the telephone network interface apparatus 10 as described below. As may be best understood by reference to FIG. 3, the female coaxial cable television connector 226 may be mounted to the ground bracket 228 by threading and tightening the internally threaded nut 250 over the externally threaded connector 226, inserting the connector 226 through the opening 251 formed in the ground bracket 238, placing the washer 252 over the connector 226 and threading and tightening the internally threaded nut 253 over the externally threaded connector 226 to provide a sub-assembly indicated by general numerical designation 255 in FIG. 3. The housing 222, as may be understood from FIG. 3, is also provided at its lower forward portion with an upwardly extending slot 244 for receiving a portion of the ground bracket 228 and is provided in its left side portion, as viewed in FIG. 3, with an upwardly extending slot 246 for receiving the connector 226. The sub-assembly 255 is inserted internally of the housing 222, as indicated by the arrow 256 in FIG. 3, with the ground bracket 228 extending outwardly of the housing 222 through the slot 244 (FIG. 3) as shown in FIG. 2 and with the female coaxial connector 226 extending outwardly through the inwardly extending slot 246 (FIG. 3) as shown in FIG. 2. Thereafter, the washer 257, FIG. 3, is placed over the connector 226 and the internally threaded nut 258, FIG. 3, is threaded over the connector 226, as shown in FIG. 2, and tightened to mount the sub-assembly 255 to the housing 222. It will be understood, from FIGS. 1 and 2, that the mounting of the connector 226 and ground bracket 228 to the housing 220 is in a manner such that the connector 226 and ground bracket 228 reside at least partially internally of the housing 220 and such that the connector 226 is available for being connected to the coaxial cable 236, FIG. 1, extending into the telephone network interface apparatus 10. Thus, such mounting causes the female coaxial cable connector 226 to extend out of the housing 222 sufficiently to permit the connector 226 to be connected to the male connector 234 provided on the end of the coaxial cable 236 (FIG. 1) and such mounting also causes the ground bracket 228 to extend out of the housing 222 sufficiently to permit the ground bracket to be suitably connected to the ground buss 71 in the telephone company compartment 31 to thereby connect the coaxial cable connectors 224 and 226 to earth ground.

Figure 6:
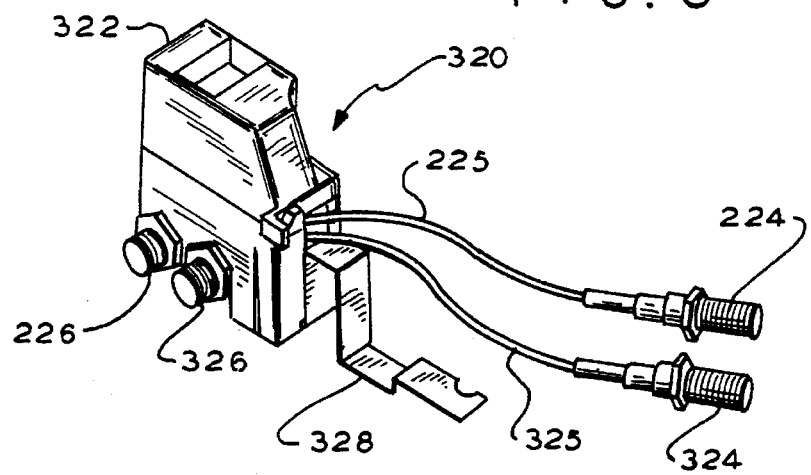
FIG. 6 is a perspective view of an alternate embodiment of a cable television module shown in the assembled condition.

Referring to FIG. 4, the lower rear portion of the housing 222 of the cable television module 220 is provided with an outwardly extending member 248, and referring now to FIG. 5, the cable television module 220 is mounted removably to the bottom 20 of the telephone network interface apparatus 10 by pivoting the cable television module 220 leftwardly as viewed in FIG. 5 and by inserting the outwardly extending member 248 (FIG. 4) under one of the upwardly extending mounting members 110, as shown in FIG. 10 of the '209 patent, by manually bending or flexing the upwardly extending member 11a' rightwardly as viewed in FIG. 5, by pivoting the cable television module 220 rightwardly to place the notch 264 (FIG. 2) under the tab 11b' after which the member 11a' is released to allow the member 11a' to pivot leftwardly as viewed in FIG. 6 to permit the tab 11b' to enter and wedgedly engage the notch 264. To remove or dismount the cable television module 220 from the telephone network interface apparatus 10, the above-described mounting procedure is reversed and it will be understood that the indentation 240 formed in the top portion of the housing 222 may receive a portion of the thumb or finger of a person to facilitate pivoting of the cable television module 220 as described above to facilitate mounting and/or dismounting of the module to and from the telephone network interface apparatus 10.

As noted above and as is shown in FIG. 5, an individual subscriber line module 91, such as individual subscriber line module 91 shown in FIGS. 12–17 of the '209 patent and described in detail therein, may be mounted laterally of and in close proximity to the cable television module 220 and it will be understood that the individual subscriber line module 91 is mounted to the apparatus 10 by inserting an outwardly extending member, such as member 114 as shown in FIG. 10 of the '209 patent under one of the upwardly extending mounting members 110 and by the tab 11b" by the member 11a" being received in a corresponding notch provided in the module 91 or by the tab 11b" extending over a portion of the top 170 of the module 91. It will be further understood that the indentation 242 formed in the corner portion of the cable television housing 220 may receive a portion of the thumb or finger of a person to facilitate grasping of the individual subscriber line module 91 to facilitate the individual subscriber line module being pivoted leftwardly as viewed in FIG. 1 to facilitate its removal or dismounting from the telephone network interface apparatus 10.

It will be understood, FIG. 5, that the telephone network interface apparatus 10, cable module 20 mounted removably to the apparatus 10, and the individual subscriber line module 91 mounted removably to the apparatus 10 comprise an embodiment of the combination apparatus of the present invention for connecting incoming telephone company wiring or lines to telephone subscriber premises wiring or lines and for connecting incoming cable television signals to a television set.

Referring again to FIG. 1 and to the demarcation points referred to above, it will be understood that upon the television set of a cable television customer not working, which customer also may be a telephone subscriber or customer, the customer may unfasten and open the subscriber cover 16 and disconnect the female coaxial cable connector 226 from the male coaxial cable connector 234 to provide a demarcation point between the customer's television set and the source of incoming cable television signals. The customer may thereafter connect a second television set, such as for example a portable television set, to the female coaxial cable connector 226 and in the event that the second television set receives a television picture and sound, the customer may reasonably determine that the failure of the first television set to receive a television picture and sound is due to the first television set not working. On the other hand, upon the customer connecting the second television set to the female coaxial cable connector 226 and upon the failure of such second television set to provide a television picture and sound, the customer may make a reasonable determination that the failure of the first television set to work is due to the failure to receive incoming coaxial cable signals. Also, a cable television repairman, which upon the Regional Bell Operating Companies being able also to provide cable television signals in addition to telephone service may be also the telephone company repairman, may open the telephone company cover 14 and disconnect the female coaxial cable connector 224 and the male coaxial cable connector 230 to provide a demarcation point between the customer's television set and the incoming cable television signals. Such repairman may then connect suitable cable television signal test apparatus to the male coaxial cable connector 230 and in the event that such test apparatus indicates reception of incoming coaxial cable television signals the cable television repairman may make a reasonable determination that the failure of the customer's television set to provide pictures and sound is due to the set not working. Alternatively, if such cable television signal testing apparatus does not indicate reception of incoming cable television signals a reasonable determination is made that the failure of the customer's television set to provide picture and sound is due to the failure to receive incoming cable television signals. The cable television repairman may also disconnect the female coaxial cable connector 226 and male coaxial cable connector 234 to provide a demarcation point therebetween and thereafter connect the cable television signal testing apparatus to the female coaxial cable connector 226 and make a determination, after having made the preceding described determination, as to whether the cable television module 220 is working or not.

Figure 7:
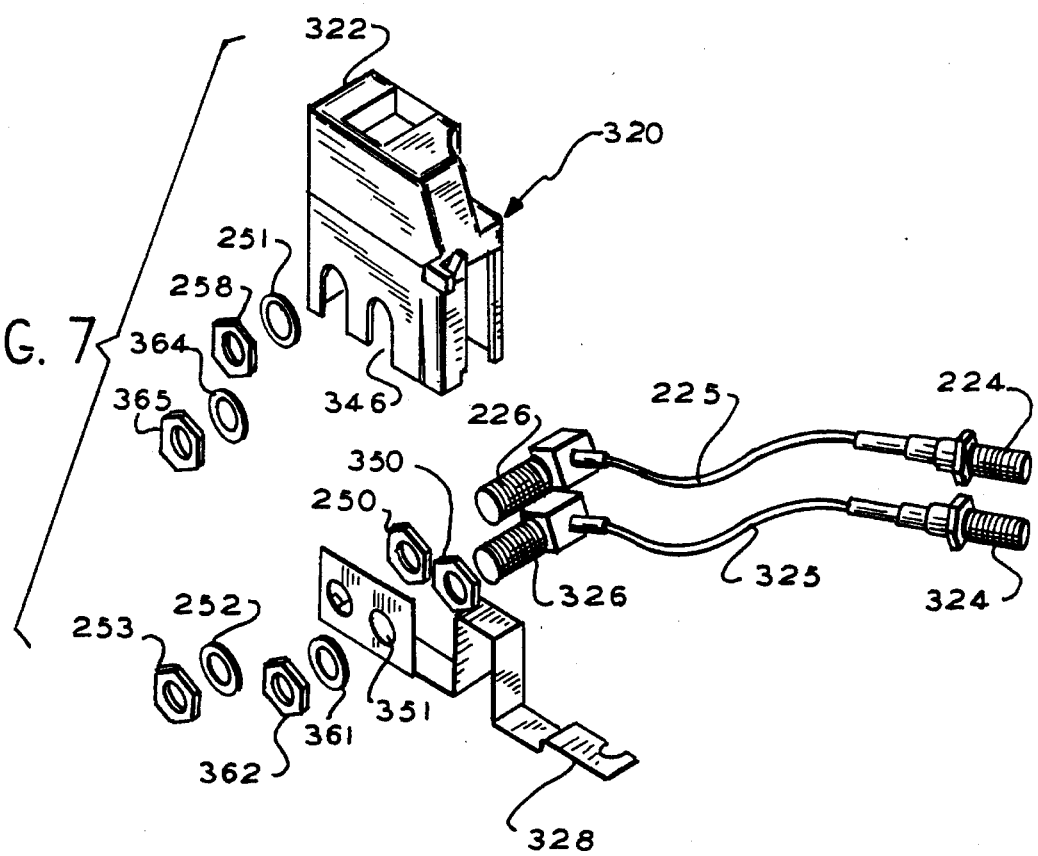
FIG. 7 is a perspective exploded view of the cable television module of FIG. 5 shown in the disassembled condition.

In the event that it is desired to connect or carry additional incoming cable television signals to the television set beyond the capacity of the coaxial cable 232 (FIG. 1) to carry cable television signals, an alternate embodiment cable television module of the present invention indicated by general numerical designation 320 and shown in FIGS. 6 and 7 may be utilized. Cable television module 320 is the same as cable television module 220 except that cable television module 320 includes additional coaxial cable connectors 324 and 326 interconnected by a length of coaxial cable 325 and the housing 322 includes a second inwardly extending slot 346, FIG. 7, for receiving the connector 326, additionally the ground bracket 328 includes an opening 351 for receiving the connector 326. It will be understood that the coaxial cable connector 226 is mounted to the ground bracket 328 and to the housing 322 as described above with regard to housing 322, and it will be further understood that the coaxial cable connector 326 is mounted to the ground bracket 328 and the housing 322 by the internally threaded nuts 350, 362, and 365 and the washers 361 and 364 in the same manner that the connector 226 is mounted to the ground bracket 228 and housing 222 of FIGS. 2 and 3 as described above. It will be further understood by referring to FIG. 6 that upon such mounting the female coaxial cable 326 resides at least partially internally of the housing 322 and extends outwardly of the housing sufficiently to permit the connector 326 to be connected to a coaxial cable, not shown, which would extend into the telephone subscriber compartment 32 of FIG. 1 and which would be connected to the television set. It will be further understood by reference to FIG. 5 that the coaxial cable connector 324 is made available for connection to an additional coaxial cable, not shown, which would extend into the telephone compartment 31 of FIG. 1 and which would carry additional incoming cable television signals from a suitable source. Such connections would permit additional incoming cable television signals to be carried to the television set. It will be further understood that instead of carrying additional incoming cable television signals to a single television set the alternate embodiment cable television module 320 may be used to carry incoming cable television signals to a second television set which may be a television set of a single telephone subscriber or customer or may be used to carry cable television signals to another telephone company subscriber or customer whose subscriber premises line or wiring is also connected to an incoming telephone company line by the telephone network interface apparatus 10.

It will be further understood that the female connectors 324 and 326 of FIG. 6 may be disconnected from the male coaxial cable connectors (not shown) of the coaxial cables described above for carrying the additional incoming cable television signals and for connecting such additional incoming cable television signals to the customer's cable television set to provide demarcation points in the same manner as described above with regard to the disconnection of the female connectors 224 and 226 (FIG. 7) from the male coaxial cable connectors 230 and 234.

Figure 8:
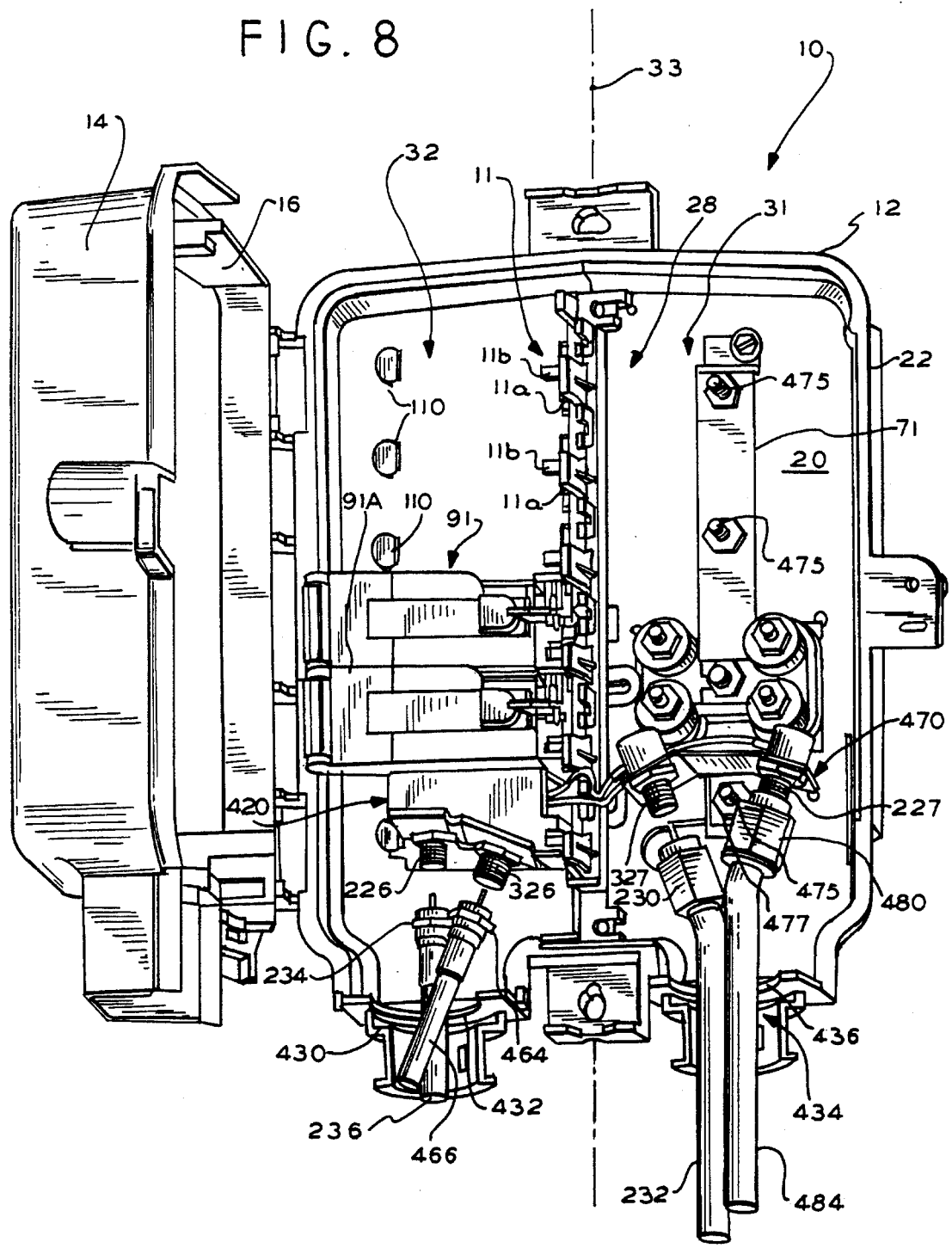
FIG. 8 is a front perspective view showing an alternate embodiment of combination telephone network interface apparatus and cable television module mounted to the apparatus, the telephone network interface apparatus is substantially the same as that disclosed in the '209 patent.

Referring now to FIGS. 8–12, a further alternate embodiment cable television module of the present invention is indicated by general numerical designation 420 and is shown in FIG. 8 as being mounted removably to the telephone network apparatus 10. It will be understood that structural elements shown in FIGS. 8–12 which are the same as structural elements shown in FIGS. 1–7 and described above are given the same numerical designations and have the same functions as described above. Cable television module 420 is particularly useful as an alternative to the cable television module 320 shown in FIGS. 6 and 7 and described above. While the design and structure of cable television module 320 is useful in interconnecting two coaxial cables carrying incoming cable television signals with two coaxial cables to be connected to one or more television sets, the design and structure do present some difficulty in the threaded interconnecting of the male coaxial cable connectors of two coaxial cables to the female coaxial cable connectors 226 and 326 of FIG. 6. This difficulty is due to the fact that the two coaxial cables connected to such female coaxial cable connectors enter a single coaxial cable access opening of relatively limited size or dimension provided in the telephone network interface apparatus 10. This coaxial cable access opening 18 is indicated by general numerical designation 430 in FIG. 8 and it will be noted that the pair of outgoing coaxial cables 236 and 466 both enter the single access opening 230. It will be understood that upon the pair of coaxial cable connectors 226 and 326 of cable television module 320, FIG. 6, being mounted in a parallel manner to the module, and upon the pair of outgoing coaxial cables 236 and 466 (FIG. 8) entering the single coaxial cable access opening 430, there is a tendency for the pair of male coaxial cable connectors 234 and 464 (FIG. 8) to unwantedly contact and interfere with each other as they are connected respectively to the parallel mounted coaxial cable connectors 226 and 326 of FIG. 6. Generally, it will be understood that by mounting the pair of female coaxial cable connectors 226 and 326 at an angle with respect to each other as shown in FIG. 8, the interconnecting of the male coaxial cable connectors 234 and 464 to the angularly mounted female coaxial cable connectors 226 and 326 is facilitated or made easier. Access opening 430 is defined by generally semi-circular portion 432 provided on the base 20 of the telephone network interface apparatus 10 which semi-circular portion 432 is opposed by a correspondingly located semi-circular portion (not shown) provided on the subscriber cover 16. These opposed semi-circular portions, upon the subscriber cover 16 being fastened to the telephone network interface apparatus base 20, provide a generally circular opening which, as known to those skilled in the art, is typically filled with a grommet providing a seal with the coaxial cables entering the access opening 430 upon the coaxial cables being inserted through the grommet. Referring still to FIG. 8, it will be understood that the telephone network interface apparatus 10 provides a second coaxial cable access opening indicated by general numerical designation 434. The coaxial cable access opening 434 is provided in substantially the same manner as the coaxial cable access opening 430 but is defined by a generally semi-circular indentation or portion 436 and a corresponding semi-circular portion, not shown, provided in the telephone company cover 14.

Cable television module 420, FIGS. 9 and 10, includes a housing indicated by general numerical designation 422 which, as may be best understood from FIG. 10, includes a bottom housing portion indicated by general numerical designation 440 and a top housing portion indicated by general numerical designation 442. Bottom housing portion 440 includes two front wall portions 443 and 444 provided, respectively, with inwardly extending generally semi-circular indentations or portions 445 and 446. Referring still to FIG. 10, upper housing portion 442 includes front wall portions 448 and 449 provided, respectively, with inwardly extending generally semi-circular indentations or portions 451 and 452. It will be understood that upon the bottom and top housing portions 440 and 442 being assembled as shown in FIG. 9, the inwardly extending semi-circular portions 445 and 446 and 451 and 452 of FIG. 10 cooperatively provide generally circular openings through which the female conductors 226 and 326 of FIG. 10 extend outwardly. The upper housing portion 442 is also provided with an inwardly extending slot 454 which, upon the bottom and top housing portions 440 and 442 being assembled, provides an opening through which the coaxial cables 225 and 325 extend outwardly as shown in FIG. 8.

It will be further understood from FIG. 10 that the lower housing portion 440 is also provided with an upwardly extending cylindrical portion 455 having a cylindrical passageway 456 extending therethrough for receiving the threaded fastener or screw 458. The top housing portion 442, FIG. 10, is provided with a corresponding cylindrical portion 458, shown in dashed outline in FIG. 10, which may have, for example, a threaded insert (not shown) inserted therein for threaded engagement with the threaded fastener screw 458 to assemble the bottom housing portion 440 and 452 as shown in FIG. 9. It will be understood that upon such assembly the top and bottom housing portions 440 and 442 cooperatively provide an internal compartment for receiving the portions of the female coaxial cable connectors 226 and 326 of FIG. 9 and which connectors are secured to the cable television module 420 by the washers 252 and 361 and internally threaded nuts 253 and 362 in the same general fashion that such washers and nuts shown in FIG. 7 mount the female coaxial connectors 226 and 326 of FIG. 7 to the cable television module 320 as described above. On being so mounted, it will be understood from FIG. 9 that the female coaxial cable connectors 226 and 326 extend sufficiently outwardly of the module to permit their connection to male coaxial cable connectors.

Referring again to FIG. 10, it will be particularly noted that the front wall portions 443 and 444 of the bottom housing portion 440 are disposed angularly with respect to each other and at an included obtuse angle $\Theta$ which is about 165° to about 175° and preferably about 170°. Similarly, in FIG. 9, it will be understood that the front wall portions 448 and 449 of the top housing portion 442 are also disposed angularly with respect to each other and at the same included obtuse angle $\Theta$. Thus, upon the lower and bottom housing portions 440 and 442 being assembled as shown in FIG. 9, such respective front wall portions cooperatively provide the module 420 with front wall portions which are angularly disposed and provided with the included obtuse angle Θ. This disposes the female coaxial cable connectors 226 and 326 angularly with respect to each other with the included obtuse angle Θ.

Referring again to FIG. 8, it will be presumed that the cable television module 420 has been mounted removably to the base 20 of the telephone network interface apparatus 10 by substantially the same method in which the earlier described cable television modules 220 and 320 of the present invention were mounted to the base 20 of the telephone network interface apparatus 10 as shown in FIG. 1. The bottom portion 40 of the cable television module 420 may be provided with a pair of downwardly extending members 471 and 472 as shown in FIGS. 9 and 10 which downwardly extending members may be received in holes or openings (not shown) provided in the base 20 of the telephone network interface apparatus 10 the same as the hole 112 shown in FIG. 10 of the '209 patent. It will be understood from FIG. 8 that the angular disposition of the front wall portions of the top and bottom module housing portions having an included obtuse angle Θ as described above and as shown in FIGS. 9 and 10 present the female coaxial connectors 226 and 236 angularly as described above and for a more convenient threaded interconnection with the male coaxial cable connectors 234 and 464 provided respectively at the ends of the coaxial cables 236 and 466 shown in 10 as being inserted through the coaxial cable access opening 430. The coaxial cables 236 and 466 may carry incoming cable television signals to one or two television sets of a telephone subscriber whose telephone subscriber line may be connected to an incoming telephone company line by one of the individual telephone modules 91 or 91A shown in FIG. 8, or the coaxial cables 236 and 466 may connect or carry incoming cable television signals to the television sets of two different telephone company customers or subscribers whose subscriber lines or wiring may be connected to two incoming telephone lines or wiring by such individual subscriber line modules 91 and 91A. Thus, it will be understood that comparatively the angular disposition of the female coaxial cable connectors 226 and 326 facilitates interconnection with the male connectors 234 and 464 as compared to the female coaxial cable connectors 226 and 326 disposed in a parallel fashion as shown in FIG. 6 with regard to the cable television module 320.

Referring now to FIGS. 8 and 11, the cable television apparatus of the present invention may further include a ground bracket indicated by general numerical designation 470 made of a suitable electrically conductive material as the ground bracket 228 of FIG. 2 and the ground bracket 328 of FIG. 6. The ground bracket 470 may include a portion 472, FIG. 11, provided with an opening or hole 473 for receiving an externally threaded mounting stud 475, FIG. 8, connected electrically to and extending upwardly from the ground buss 71. An internally threaded nut 477, FIG. 8, may be provided to threadedly engage the mounting stud 475 to mechanically fasten and electrically interconnect the ground bracket 470 to the ground buss 71. Referring again to FIG. 11, the ground bracket 470 may further include angularly disposed portions 481 and 482 and an integrally formed intermediate portion 483. It will be particularly understood from FIG. 11 that the angular portions 481 and 482 are disposed angularly with respect to the intermediate portion at an included angle α and that the angularly disposed portions 481 and 482 are also disposed angularly with respect to each other at an included angle β. The angle α is about 155° to about 165° and preferably about 160°, and the angle β is about 145° to about 155° and preferably is about 140°.

The angularly disposed portions 481 and 482 of the ground bracket 70, FIG. 11, are provided with respective holes or openings 484 and 485 for receiving the female coaxial cable connectors 227 and 327, FIGS. 9 and 10, which extend therethrough for mechanical and electrical interconnection to the ground bracket by internally threaded nuts 485 and 486 as may be best seen in FIG. 12.

It will be understood from FIG. 12 that upon the ground bracket 470 being mounted to the base 420 of the telephone network interface apparatus 10 the angularly disposed portions 481 and 482 of such ground bracket present the female coaxial cable connectors 227 and 327 angularly for threaded interconnection with the male coaxial cable connectors 230 and 480 provided respectively on the incoming pair of coaxial cables 232 and 484 carrying incoming cable television signals and both extending through the single coaxial cable access opening 434 shown in FIG. 8. The angular disposition of the female coaxial cable connectors 227 and 327 due to their mounting in the angularly disposed ground bracket portions 481 and 482 facilitate such threaded interconnection between the female coaxial cable connectors 227 and 327 and the male coaxial cable connectors 230 and 480 in the same manner that angularly disposed female coaxial cable connectors 226 and 326 facilitate threaded interconnection to the male coaxial cable connectors 234 and 464 as shown in FIG. 12 and described above.

It will be understood, FIG. 8, that the telephone network interface apparatus 10, individual subscriber line module 91 and/or 91A and cable television module 420 comprise a further alternate combination embodiment of the present invention.

Figure 13:
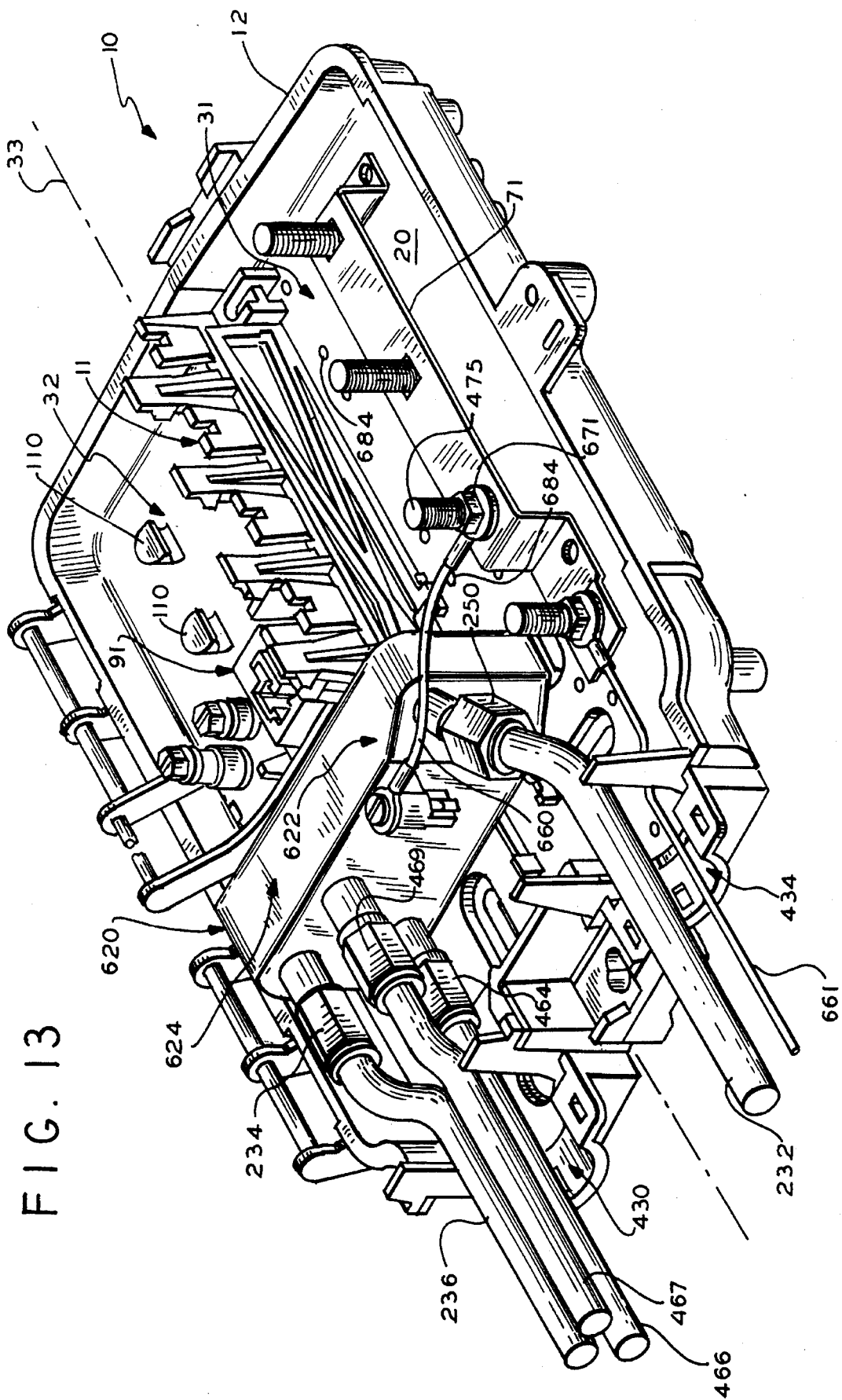
FIG. 13 is a perspective view of the base portion of the telephone network interface apparatus shown in FIG. 1 and is substantially the same as that disclosed in the '209 patent, and shows a further embodiment of a cable television module embodying the present invention.
Figure 14:
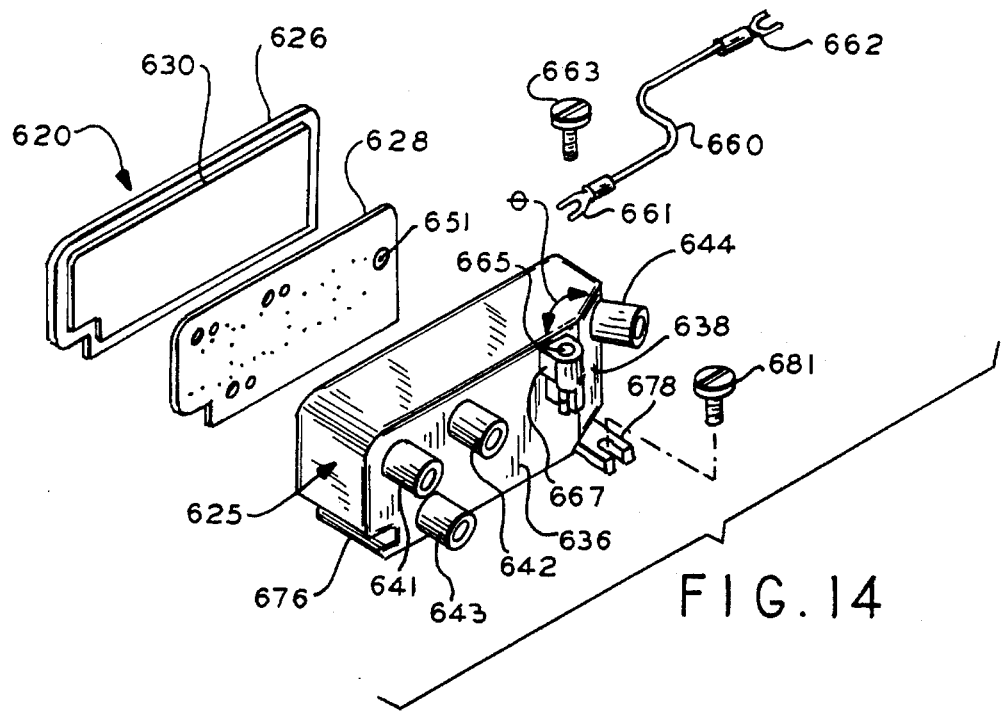
FIG. 14 is an exploded front perspective view of the cable television module shown in FIG. 13.
Figure 15:
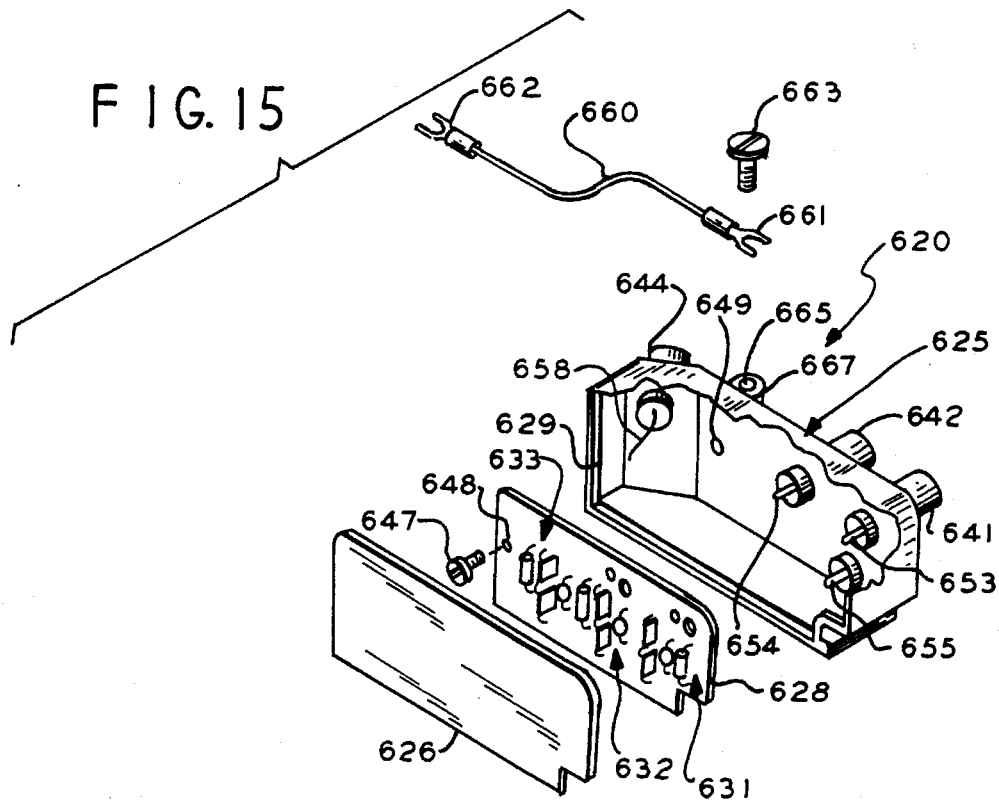
FIG. 15 is a rear exploded perspective view of the cable television module shown in FIG. 13.

Referring now to FIGS. 13–15, a further alternate embodiment cable television module of the present invention is indicated by general numerical designation 620 and is shown in FIG. 13 as being mounted removably to the telephone network interface apparatus 10; it will be understood that only the base portion 12 of the telephone network interface apparatus 10 is shown in FIG. 13 and that the telephone company and telephone subscriber covers 14 and 16 shown in FIGS. 1 and 8, although not shown in FIG. 13, are included in the module 620 but have been deleted from FIG. 13 for convenience and simplicity of illustration. It will be further understood that the structural elements shown in FIG. 13 which are the same as the structural elements shown particularly in FIGS. 1 and 8 and described above are given the same numerical designations and have the same functions as described above. The cable television module 620 includes a first portion 622 for residing in the telephone company compartment portion 31 and a second portion 624 for residing in the telephone subscriber compartment portion 32. It will be generally understood that the cable television module 620 includes an interiorly mounted cable television signal splitter for receiving incoming cable television signals carried by the coaxial cable 232 and for splitting the incoming cable television signals into three outgoing cable television signals, or streams or channels of cable television signals, carried by the coaxial cables 236, 466 and 467 to three television sets (not shown) of one or two or three telephone company subscribers or customers whose telephone, or telephones, are interconnected to an incoming telephone line or lines by the telephone network interface apparatus 10. More particularly, a telephone subscriber's or customer's television set which receives one of the outgoing cable television signals may have its telephone interconnected to an incoming telephone line by individual subscriber module 91. It will be further understood that cable television modules embodying the present invention may include cable television splitters for splitting incoming cable television signals into different numbers of outgoing cable television signals.

More particularly, it will be further understood by reference to FIGS. 14 and 15, that the cable television module 620 comprises a generally box-like structure including a front portion, indicated by general numerical designation 625, having an open back and a separate back or rear member 626; the front portion 625, note FIG. 15, is provided with a groove 629 for receiving a tongue portion or projection 630 (FIG. 14) provided on the back member 626. The box-like structure provides a generally hollow interior for receiving a printed circuit board 628 on which are suitably mounted and electrically interconnected pluralities of electrical components indicated by general numerical designations 631, 632 and 633 in FIG. 15 and which pluralities of electrical circuit components provide a 1 to 3 cable television signal splitter for splitting incoming cable television signals carried by the coaxial cable 232 (FIG. 13) into three coaxial cable signals for being carried or transmitted to three television sets by the coaxial cables 236, 466 and 467 (FIG. 13) as noted above. It will be understood that such plurality of electrical components may be any of several combinations of commercially available electrical components for providing a one to three cable television signal splitter.

The front portion 625 of the cable module 620, FIG. 14, includes a first front wall 636 and a second front wall 638 which front walls are disposed angularly with respect to each other at an included angle Φ which permits the end portion 622 of the cable television module 620 to terminate as shown in FIG. 13 and not be required to extend further into the telephone company compartment portion 31 to permit the coaxial cable 232 to be connected to the module; the ground buss 71 must be mounted in the telephone company compartment portion 31 and hence there is insufficient room to permit the cable module end portion 622 to extend into the telephone company compartment portion 31 and reside directly opposite the access opening 434 through which the coaxial cable 232 enters for connection to the cable module 620. Thus, it will be understood that the angular disposition of the front and second walls of the included angle Φ facilitate the connection of the coaxial cable 232 to the module 620.

Extending outwardly perpendicularly from the first front wall 636 are a plurality of tubular members 641, 642 and 643 and extending perpendicularly outwardly from the second front wall 638 is a tubular member 644. It will be understood that suitably mounted in such tubular members are coaxial cable connector components comprising female coaxial cable connector or components (not shown) but of the type well known to the art. The female coaxial cable connector mounted in the tubular member 644 is for being connected to the male coaxial cable connector 250 provided on the end of the coaxial cable connector 232 (FIG. 13) and the coaxial cable connectors provided in the tubular members 641, 642 and 643 are for being connected to the male coaxial cable connectors 234, 464 and 469 provided respectively on the ends of the coaxial cables 236, 466 and 467 shown in FIG. 13.

The front portion 625 and rear wall member 626 of the cable television module 620 may be suitably cast from an electrically conductive material such as zinc and may thereafter be chromium or nickel plated; the tubular members 641–644 may be cast integrally with the front module portion 625, alternatively the tubular members 641–644 may be suitably manufactured separately and thereafter suitably mounted to the front portion 625. It will be understood that the module 620 may be made of other suitable electrically conductive materials and may be made by other forms of manufacture other than casting known to the metal forming art.

The printed circuit board 628 is received and mounted within the interior of the front portion 625 of the cable television module 620 by a plurality of screws, only one screw, screw 647 is shown in FIG. 15, which screw is inserted through a hole 648 formed in the board 628 as shown and threaded into a hole 649 formed in the first front wall 636; it will be understood that additional screws are used but are not shown for convenience of illustration. The hole 648, FIG. 14, is surrounded by an outwardly extending pad or annular member 651 which is electrically interconnected with the pluralities of electrical components 631, 632 and 633 (FIG. 15) comprising the two to three cable television splitter and engagement of the pad or annular member 651 with the module front portion 625 electrically interconnects the pluralities of electrical components 631, 632 and 633 to the electrical conductive front portion 625.

It will be further understood from FIG. 15 that the coaxial cable connector components providing the female coaxial cable connectors received within the tubular members 641, 642 and 643 are electrically interconnected to the pluralities of electrical components 631, 632 and 633 by pins 653, 654 and 655 and that the female coaxial cable connector components comprising the female coaxial cable connector received within the tubular member 644 are provided with an electrical conductor 658 connected to the pluralities of electrical components 631, 632 and 633.

The cable television module 620 includes a ground conductor 660 provided on opposite ends with generally U-shaped electrical conductors 661 and 662. The connector 661 is mechanically and electrically interconnected to the electrically conductive front portion 625 of the cable television module 620 by the threaded member 663 which is threadedly received within a threaded hole 665 provided in the member 667 extending perpendicularly outwardly from the first front wall 636 and which may be cast integrally therewith. The other electrical connector 662 is connected to an upwardly extending threaded stud or post 475 (FIG. 13) and mechanically and electrically interconnected thereto, and to the ground buss 71, by the internally threaded nut 671 shown in FIG. 13. The ground conductor 660 connects the electrically conductive front portion 636 of the cable television module 620 to ground and since the components providing the female coaxial cable connectors residing in the tubular members 641–644 are connected to the printed circuit board 629 which in turn is connected to the front portion 625 by the threaded member 647 as described above, the female coaxial cable connectors and the pluralities of electrical components providing the one to three cable television splitter are connected to the ground buss 71 which is connected to earth ground by the conductor 661 shown in FIG. 13.

Upon the printed circuit board being mounted in the front portion 625 of the cable television module 620 described above, the member 626 is fitted into the groove 629 (FIG. 15) and suitably mechanically and electrically connected thereto such as by welding or by a suitable adhesive or epoxy.

The cable television module 620 is mounted removably to the bottom 20 of the telephone network interface apparatus base 12 (FIG. 13). The cable television module 620 (FIG. 14) is provided on one end with an outwardly extending member 676 for being received under an upwardly extending inverted L-shaped member 110 (note such members 110 shown in FIG. 13) and the other end of the front portion 625 of the cable television module 620 is provided with an outwardly extending, and integrally formed by being cast therewith, generally U-shaped member 678 for receiving the threaded member 681 which is threaded into a threaded hole formed in the base 20 such as holes 684 shown in FIG. 13.

Figure 16:
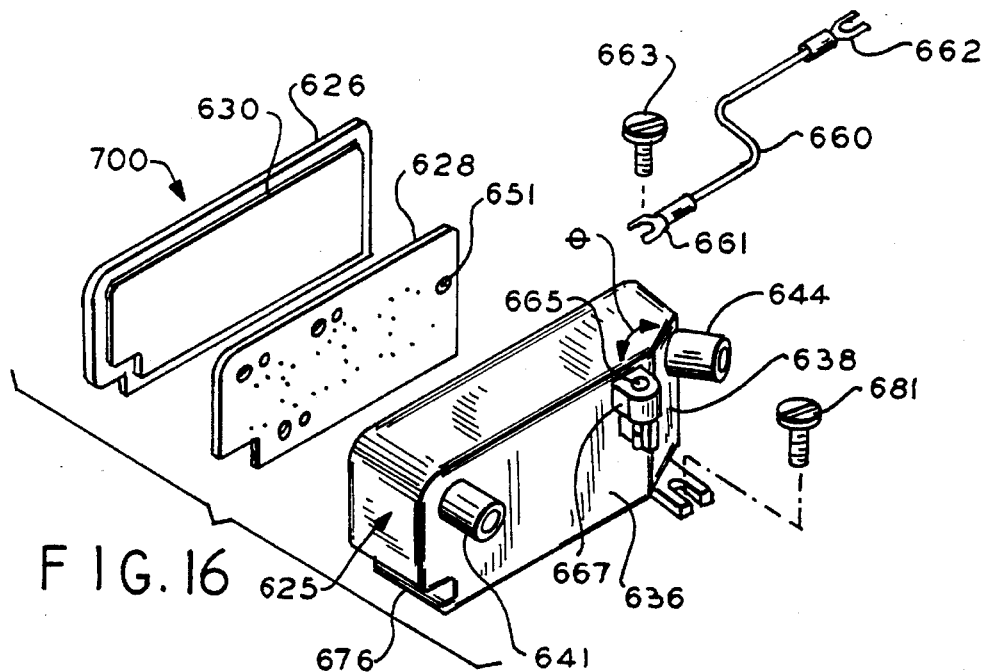
FIGS. 16 and 17 are similar to FIGS. 14 and 15 but of a further embodiment of a cable television module embodying the present invention.
Figure 17:
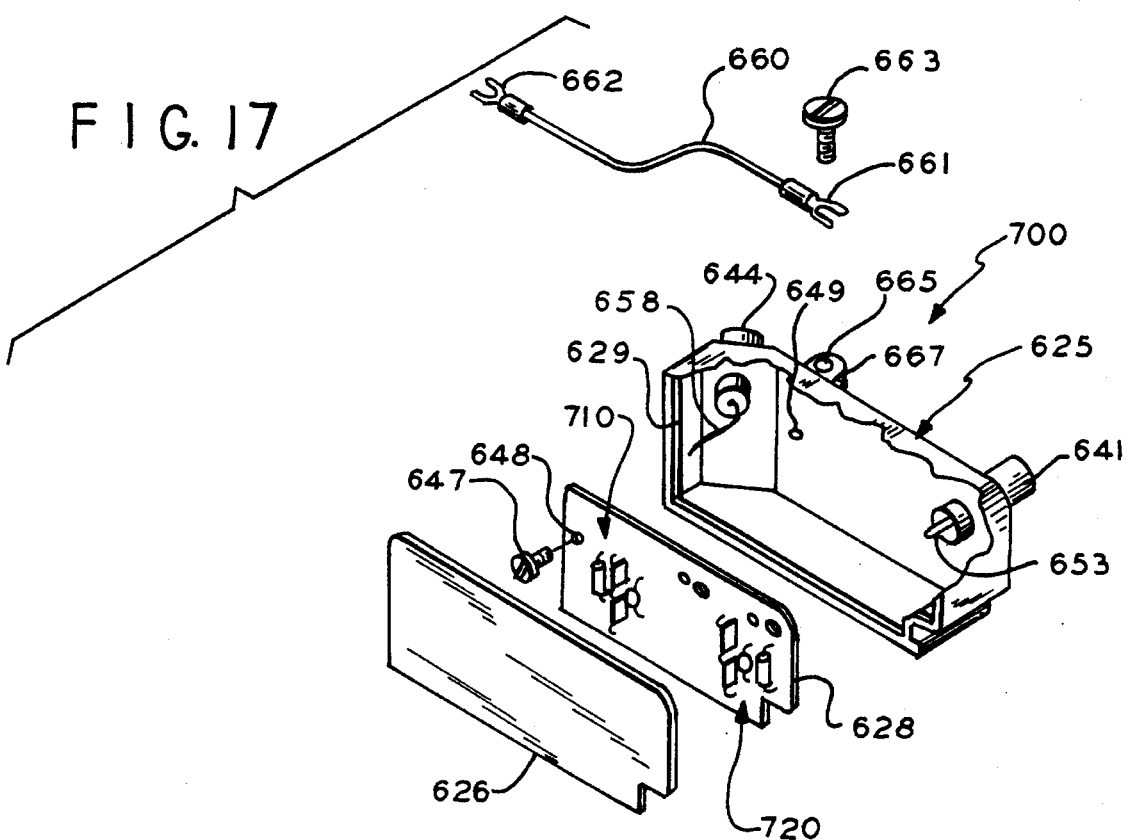

A further cable television module embodying the present invention is shown in FIGS. 16 and 17 and is indicated by general numerical designation 700. Module 700 is similar to the module 620 of FIGS. 13–15 and structural elements included in the cable television module 700 which are the same as the structural elements included in the cable television module 620 are given the same numerical designation and have the same functions. Module 700 differs from module 620 in that only a single tubular member, 641, extends generally perpendicularly outwardly from the first wall 636; tubular members 641 and 644 contain respectively pluralities of cable connector circuit components comprising coaxial cable connectors as did tubular members 641 and 644 of FIGS. 14 and 15. Cable television module 700 further differs from cable television module 620 in that the printed circuit board 628 instead of having a cable television splitter circuit mounted thereon has a circuit mounted thereon for compensating for gain or loss between incoming cable television signals received by the coaxial cable connector mounted in tubular member 644 and the incoming cable television signals received by the coaxial cable connector mounted in tubular member 641. The compensation circuit is of the type known to the art and is comprised of pluralities of electrical components of the type known to the art and such components are indicated by general numerical designations 710 and 720 in FIG. 17. The pluralities of electrical components 710 and 720 are mounted and interconnected by the printed circuit board 628 in the manner known to the art.

Further alternatively, a cable television module embodying the present invention may include the structural elements shown in FIGS. 14 and 15 and 16 and 17 except that instead of having a printed circuit board mounted therein containing electrical components comprising either a cable television splitter or gain or loss signal strength compensation circuit, the generally box-like structure comprising the cable television module may have a coaxial cable mounted therein, such as coaxial cable 225 shown in FIG. 2, which interconnects the coaxial cable connector components providing the coaxial cable connectors mounted or received respectively within the tubular members 641 and 644. In this embodiment, the electrically conductive generally box-like coaxial cable module functions as a ground block for grounding the coaxial cable connectors contained within the tubular members 641 and 644 and connects them to the ground buss 71, and thereby to earth ground, by the ground connecting conductor 660 as described above.

Referring again to the coaxial cable connectors, it will be understood that the coaxial cable connectors 226, 326, 227 and 327 may be commercially available F type right angle female coaxial connectors, that the coaxial cable connectors 224 and 324 may be commercially available F type in line female coaxial cable connectors and that the lengths of coaxial cable 225 and 325 may be commercially available RG179 coaxial cable.

It will be understood by those skilled in the art that many modifications and variations may be made in this invention without departing from the spirit and the scope thereof.

What is claimed is:

1. Apparatus for interconnecting incoming cable television signals to at least one television set, comprising:

cable television module means for being mounted to telephone network interface apparatus for connecting at least one incoming telephone line to at least one telephone subscriber's line, said telephone network interface apparatus including a telephone company compartment portion, a telephone subscriber compartment portion, first coaxial cable access means for permitting at least a first coaxial cable carrying the incoming cable television signals to be inserted therethrough and into said telephone company compartment portion and second coaxial cable access means for permitting at least a second coaxial cable connected to the at least one television set to be inserted therethrough and into said telephone subscriber compartment portion, said second coaxial cable for carrying said incoming cable television signals to said television set;

said cable television module means including a first module portion and a second module portion, upon said cable television module means being mounted to said telephone network interface apparatus said first module portion disposed generally adjacent to and spaced from said first cable access means and said second module portion disposed generally adjacent to and opposite said second cable access means;

said cable television module means further including at least first coaxial cable connector means mounted to said first module portion and for being connected to said first coaxial cable, and at least second coaxial cable connector means mounted to said second module portion and for being connected to said second coaxial cable;

said first module portion and said second module portion disposed angularly with respect to each other to facilitate connection of at least said first coaxial cable to said first coaxial cable connector means;

interconnecting means provided in said cable television module means and interconnecting said first coaxial cable connector means to said second coaxial cable connector means to transmit said incoming cable television signals from said first coaxial cable connector means to said second coaxial cable connector means; and mounting means for mounting said cable television module means to said telephone network interface apparatus. .

2. The apparatus according to claim 1 wherein said subscriber compartment portion is provided with an upwardly extending inverted L-shaped member, wherein said cable television module means includes a pair of opposed ends, wherein said mounting means comprise: (i) a member extending outwardly from one of said opposed ends and for being received under said upwardly extending inverted L-shaped member, and (ii) a threaded member extending through an opening provided on the other of said opposed ends and said threaded member for threadedly engaging said telephone network apparatus in said telephone compartment portion.

3. The apparatus according to claim 1 wherein said cable television module means comprise a generally hollow box-like structure provided with at least a first generally tubular member extending generally perpendicularly outwardly from said first module portion and with at least second generally tubular member extending substantially perpendicularly outwardly from said second module portion, said first tubular member receiving components providing said first coaxial cable connector means and said second tubular member receiving components providing said second coaxial cable connector means.

4. The apparatus according to claim 1 wherein said telephone network interface apparatus further includes a ground buss mounted in said telephone company compartment portion for being connected to earth ground, wherein said cable television module means comprise a generally hollow box-like structure made of electrically conductive material and wherein said first and second coaxial cable connector means and said interconnecting means are connected to said box-like structure, and wherein said module means further comprise ground connecting means interconnecting said box-like structure with said ground buss.

5. The apparatus according to claim 1 wherein said interconnecting means comprise compensation means for compensating for gain or loss in signal strength between the incoming cable television signals received by said first coaxial cable connector means and the incoming cable television signals received by said second coaxial cable connector means.

6. The apparatus according to claim 1 wherein said cable television module means further comprise at least third coaxial cable connector means mounted to said second module portion and connected to said interconnecting means, said third coaxial connector means for being connected to a third coaxial cable extending through said second coaxial cable access means and for being connected to a second television set, and wherein said interconnecting means comprise cable television signal splitter means for receiving and splitting said incoming cable television signals into at least two outgoing cable television signals for being carried respectively to said first and second television sets by said second and third coaxial cable connector means and said second and third coaxial cables.

7. Apparatus for interconnecting incoming cable television signals to at least two television sets, comprising:

cable television module means for being mounted to telephone network interface apparatus for connecting at least one incoming telephone line to at least one telephone subscriber's line, said telephone network interface apparatus including a telephone company compartment portion, a telephone subscriber compartment portion, first coaxial cable access means for permitting at least one coaxial cable carrying said incoming cable television signals to be inserted therethrough and into said telephone company compartment and second coaxial cable access means for permitting at least two coaxial cables connected to said at least two television sets to be inserted therethrough and into said telephone subscriber compartment portion;

said cable television module means including a first module portion and a second module portion, upon said cable television module means being mounted to said telephone network interface apparatus said first module portion disposed generally opposite said first cable access means and said second module portion disposed generally opposite said second cable access means;

said module means including at least first coaxial cable connector mounted to said first module portion and for being connected to said at least one coaxial cable carrying said incoming cable television signals, second and third coaxial cable connectors mounted to said second module portion and for being connected to said at least two coaxial cables connected to said at least two television sets, and cable television signal splitter means mounted interiorly of said cable television module means and connected to said first, second and third coaxial cable connectors, said cable television signal splitter means for receiving and splitting said incoming cable television signals into at least two outgoing cable television signals for transmission to said at least two television sets;

said first and second module portions disposed angularly with respect to each other at an included angle to facilitate the connection of said at least one coaxial cable carrying said incoming cable television signals to said first coaxial cable connector; and mounting means for mounting said cable television module means to said telephone network interface apparatus.

8. The apparatus according to claim 7 wherein said telephone compartment portion is provided with a ground buss for being connected to earth ground, and wherein said cable television module means further includes ground connecting means connected to all of said coaxial cable connectors and said cable television signal splitter means and for being connected to said ground buss to connect all of said coaxial cable connectors and said cable television signal splitter means to earth ground.

9. The apparatus according to claim 8 wherein said cable television signal splitter means comprise a printed circuit board and a plurality of electrical components mounted on and electrically connected by said board, said plurality of electrical components connected to said first, second and third coaxial cable connectors.

10. The apparatus according to claim 9 wherein said cable television module means comprise a generally box-like structure made of electrically conductive material, wherein said printed circuit board is provided with outwardly extending electrical conductor means for engaging and electrically connecting said plurality of electrical components to said box-like structure and wherein said ground connecting means comprise electrical conductor means for being connected between said box-like structure and said ground buss to electrically connect said box-like structure to said ground buss and thereby to electrically interconnect all of said coaxial cable connectors and said plurality of electrical components comprising said cable television splitter means to said ground buss.

11. The apparatus according to claim 7 wherein said telephone subscriber compartment portion is provided with an upwardly extending inverted L-shaped member, wherein said cable television module means includes a pair of opposed ends, wherein said mounting means comprise: (i) a member extending outwardly from one of said opposed ends and for being received under said upwardly extending inverted L-shaped member, and (ii) a threaded member extending through an opening provided on the other of said opposed ends of said module and said threaded member for threadedly engaging a portion of said telephone network interface apparatus in said telephone compartment portion.

12. The apparatus according to claim 7 wherein said cable television module means comprises a generally hollow box-like structure providing said first and said second module portions, a generally tubular member extending generally perpendicularly outwardly from said first module portion of said box-like structure and towards said first coaxial cable access means and at least two generally tubular members extending generally perpendicularly outwardly from said second module portion of said box-like structure and towards said second coaxial cable access means, wherein said first coaxial cable connector comprises a first plurality of coaxial cable connector components residing in said first tubular member and wherein said second and third coaxial cable connectors comprise second and third pluralities of coaxial cable connector components residing respectively in said second and third tubular members.

13. Combination apparatus for connecting at least one incoming telephone line to at least one telephone subscriber premises line and for interconnecting incoming cable television signals to at least one television set, comprising:

telephone network interface apparatus for connecting at least one incoming telephone line to said at least one telephone subscriber's line, said telephone network interface apparatus including a telephone company compartment portion, a telephone subscriber compartment portion, first coaxial cable access means for permitting at least a first coaxial cable carrying said incoming cable television signals to be inserted therethrough and into said telephone company compartment portion, and second coaxial cable access means for permitting at least a second coaxial cable connected to said at least one television set to be inserted therethrough and into said telephone subscriber compartment portion, said second coaxial cable for carrying said incoming cable television signals to said television set;

cable television module means mounted to said telephone interface apparatus and including a first module portion and a second module portion, said first module portion generally residing in said telephone compartment portion and disposed generally adjacent to and spaced from said first cable access means, and said second module portion generally residing in said telephone subscriber compartment portion and disposed generally adjacent to and spaced from said second cable access means;

said module means further including at least first coaxial cable connector means mounted to said first module portion and for being connected to said first coaxial cable, and at least second coaxial cable connector means mounted to said second module portion and for being connected to said second coaxial cable;

interconnecting means provided in said module and interconnecting said first coaxial cable connector means to said second coaxial cable connector means to carry said incoming cable television signals from said first coaxial cable connector means to said second coaxial cable connector means;

said first and second module portions disposed angularly with respect to each other at an included angle to facilitate connection of at least said first coaxial cable to said first coaxial cable connector means; and mounting means for mounting said cable television module means to said telephone network interface apparatus.

14. The apparatus according to claim 13 wherein said telephone subscriber compartment portion is provided with an upwardly extending inverted L-shaped member, wherein said module means includes a pair of opposed ends, wherein said mounting means comprise: (i) a member extending outwardly from one of said opposed ends and for being received under said upwardly extending inverted L-shaped member, and (ii) a threaded member extending through an opening provided on the other of said opposed ends of said module means and said threaded member for threadedly engaging a portion of said telephone network interface apparatus in said telephone compartment portion.

15. The apparatus according to claim 13 wherein said cable television module means comprise a generally hollow box-like structure providing said first and second module portions, at least one tubular member extending generally perpendicularly outwardly from said first module portion and towards said first coaxial cable access means and at least a second generally tubular member extending substantially perpendicularly outwardly from said second module portion and towards said second coaxial cable access means, said first tubular member receiving components providing said first coaxial cable connector means and said second tubular member receiving components providing said second coaxial cable connector means.

16. The apparatus according to claim 13 wherein said telephone network interface apparatus further includes a ground buss mounted in said telephone company compartment portion for being connected to earth ground, wherein said module means comprise a generally hollow box-like structure made of electrically conductive material and wherein said first and second coaxial cable connectors and said interconnecting means are connected to said box-like structure, and wherein said module means further comprise ground connecting means interconnecting said box-like structure with said ground buss.

17. The apparatus according to claim 13 wherein said interconnecting means comprise compensation means for compensating for gain or loss in signal strength between the incoming cable television signals received by said first coaxial cable connector means and the incoming cable television signals received by said second coaxial cable connector means.

18. The apparatus according to claim 13 wherein said cable television module means further comprise at least third coaxial cable connector means mounted to said second module portion and connected to said interconnecting means, said third coaxial connector means for being connected to a third coaxial cable extending through said second coaxial cable access means and for being connected to a second television set, and wherein said interconnecting means comprise cable television signal splitter means for receiving and splitting said incoming cable television signals into at least two outgoing cable television signals for being carried respectively to said first and second television sets by said second and third coaxial cable connector means and said second and third coaxial cables.

* * * * *